(12) United States Patent
Stewart et al.

(10) Patent No.: US 8,994,641 B2
(45) Date of Patent: Mar. 31, 2015

(54) INFORMATION HANDLING DEVICES WITH TOUCH-BASED REFLECTIVE DISPLAY

(75) Inventors: Aaron M. Stewart, Raleigh, NC (US);
Adam M. Smith, Chapel Hill, NC (US);
Thomas J. Sluchak, Apex, NC (US);
Jeffrey E. Skinner, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 222 days.

(21) Appl. No.: 13/222,585

(22) Filed: Aug. 31, 2011

(65) Prior Publication Data
US 2013/0050134 A1 Feb. 28, 2013

(51) Int. Cl.
*G09G 3/34* (2006.01)
*G06F 3/041* (2006.01)
*G06F 3/02* (2006.01)

(52) U.S. Cl.
CPC ............ *G06F 3/041* (2013.01); *G06F 3/021* (2013.01); *G06F 3/0213* (2013.01); *G06F 3/0416* (2013.01)
USPC .......................................... 345/107; 345/173

(58) Field of Classification Search
CPC .... G09G 3/021; G09G 3/0213; G09G 3/0416
USPC .......................................... 345/173, 1.3, 107
See application file for complete search history.

(56) References Cited

U.S. PATENT DOCUMENTS

| | | | |
|---|---|---|---|
| 2008/0225006 A1* | 9/2008 | Ennadi | 345/173 |
| 2008/0247128 A1* | 10/2008 | Khoo | 361/681 |
| 2008/0309636 A1* | 12/2008 | Feng et al. | 345/173 |
| 2011/0047459 A1* | 2/2011 | Van Der Westhuizen | 345/173 |
| 2011/0105189 A1* | 5/2011 | Lee et al. | 455/566 |
| 2011/0109588 A1* | 5/2011 | Makinen et al. | 345/174 |

OTHER PUBLICATIONS

Website—All-New Nook, The Simple Touch Reader, eReader, eBook Reader—Barnes & Noble, available at www.barnesandnoble.com/nook/features/index.asp, 6 pages, available as of Aug. 31, 2011.
Website—Optimus Maximus Keyboard, available at www.artlebedev.com/everything/optimus/, 5 pages. available as of Aug. 31, 2011.
Website—Samsung Alias 2 | Samsung SCH-U750—Cell Phones, available at www.samsung.com/us/mobile/cell-phones/SCH-0750HAAVZW, 4 pages, available as of Aug. 31, 2011.

* cited by examiner

*Primary Examiner* — Kevin M Nguyen
(74) *Attorney, Agent, or Firm* — Ference & Associates LLC

(57) ABSTRACT

Devices, methods and products are described that provide information handling devices with touch-based reflective display. One aspect provides a method comprising: providing a touchable control having one or more areas, said one or more areas providing both reflective display and accepting touch-based input; displaying data on a display device of an information handling device which does not overlap the reflective display of said one or more areas; ascertaining touch-based input to said one or more areas of said touchable control area; and executing one or more functions responsive to said touch-based input. Other embodiments are described.

21 Claims, 10 Drawing Sheets

FIG. 5A
FIG. 5B

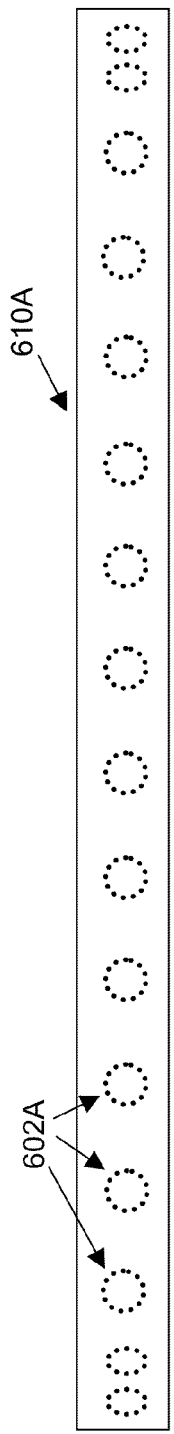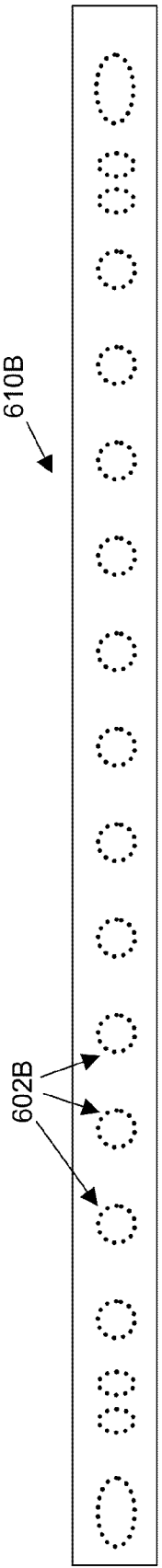

INFORMATION HANDLING DEVICES WITH TOUCH-BASED REFLECTIVE DISPLAY

BACKGROUND

The subject matter described herein generally relates to use of reflective display technology with information handling devices. Information handling devices, such as laptop computers, slate/tablet computers, smart phones, e-readers, cellular/mobile phones, external keyboards and key pads, remote controls and the like, include a variety of input devices allowing the user of an information handling device to interface with the device. Touchable controls can be fully mechanical (such as actual, physical keys) or fully on-screen (non-mechanical software implementations, with or without a touchscreen). Mechanical implementations provide familiar key positions, key layout, tactile quality, and legibility of key labels. On-screen or soft controls enable customization and dynamic updates through a software interface.

Displays for information handling devices have included touchscreen displays, such as used in laptop computers, tablet computers and mobile/cellular phones, as well as reflective display technology. For example, reflective display technology has commonly been used in connection with display devices for e-readers using reflective display technology such as E-INK or MARISOL displays.

External keyboards exist that utilize individual OLED (organic LED) displays on top of physical (mechanical) keys, as implemented in a stand-alone keyboard such as the OPTIMULS MAXIMUS keyboard. A mobile phone (SAMSUNG ALIAS 2™) exists that uses segmented reflective display technology, such as E-INK display, atop of standard cellular phone (mechanical) keys to provide a limited set of controls. In this phone, the display contents are dependent on the orientation of the cellular phone.

BRIEF SUMMARY

In summary, one aspect provides a method comprising: providing a touchable control having one or more areas, said one or more areas providing both reflective display and accepting touch-based input; displaying data on a display device of an information handling device which does not overlap the reflective display of said one or more areas; ascertaining touch-based input to said one or more areas of said touchable control area; and executing one or more functions responsive to said touch-based input.

Another aspect provides an information handling device comprising: a touchable control area having one or more areas, said one or more areas providing both reflective display and accepting touch-based input; a display device which does not overlap the reflective display of said one or more areas; and one or more processors; wherein, responsive to execution of computer program instructions accessible to the one or more processors, the information handling device is configured to: display data on the display device; ascertain touch-based input to said one or more areas of said touchable control area; and execute one or more functions responsive to said touch-based input.

A further aspect provides a program product comprising: a storage medium having program code embodied therewith, the program code comprising: computer readable program code configured to provide a touchable control having one or more areas, said one or more areas providing both reflective display and accepting touch-based input; computer readable program code configured to display data on a display device of an information handling device which does not overlap the reflective display of said one or more areas; computer readable program code configured to ascertain touch-based input to said one or more areas of said touchable control area; and computer readable program code configured to execute one or more functions responsive to said touch-based input.

A still further aspect provides an information handling device comprising: a display device; a touchable control area having a reflective display layer, a touch-based input sensing layer, and a haptic feedback layer; and one or more processors; wherein, responsive to execution of computer program instructions accessible to the one or more processors, the information handling device is configured to: display data on the display device; ascertain touch-based input to one or more areas of said touchable control area; and execute one or more functions responsive to said touch-based input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5(A-B) illustrates example touchable control areas.

FIG. 6(A-B) illustrates example touchable control areas having capacitive traces therein.

DETAILED DESCRIPTION

Figure 1:
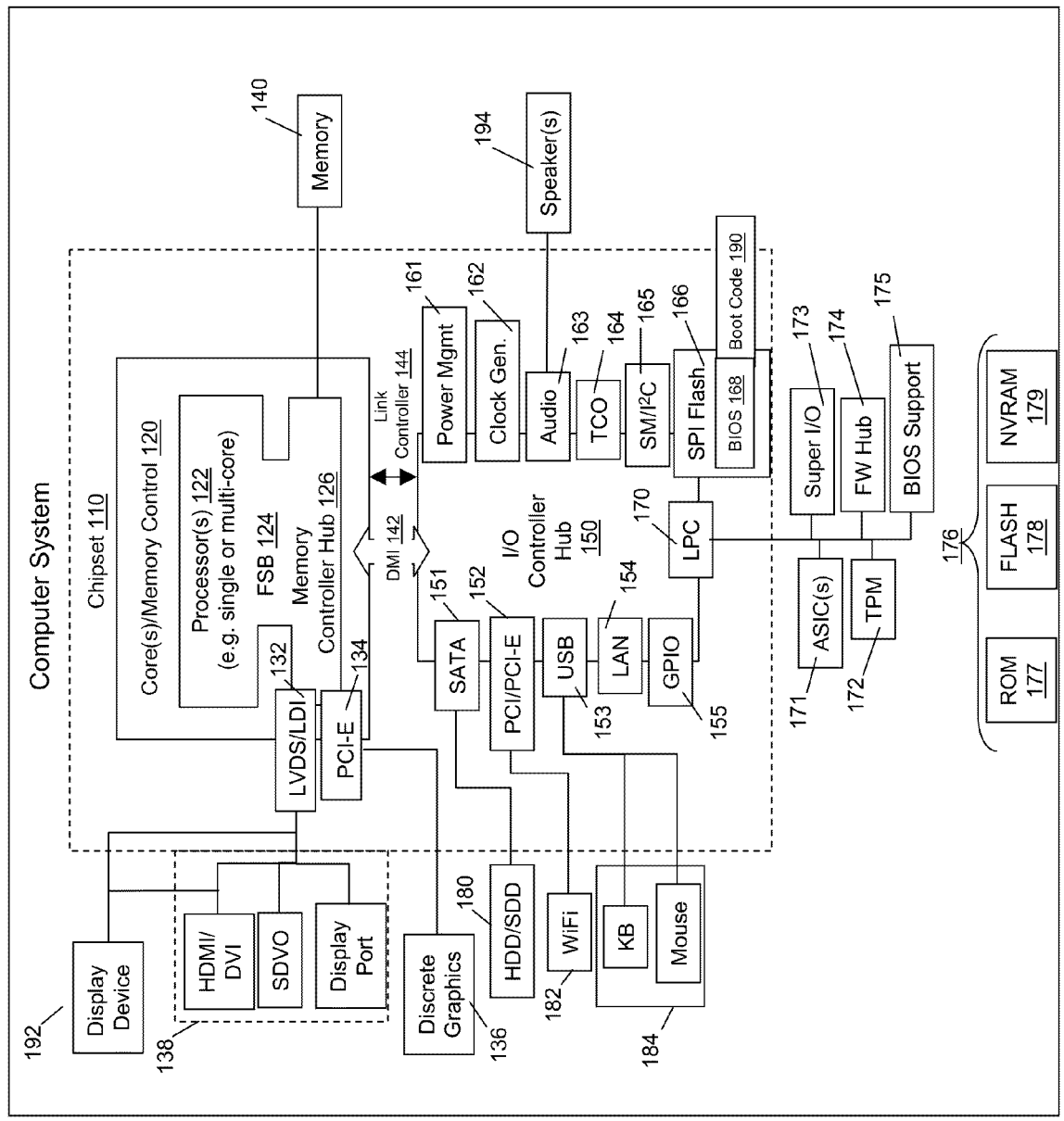
FIG. 1 illustrates an example circuitry of an information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

While reflective display technology has been used in various devices, such as for displays in e-readers and on mobile/cellular telephone physical keys individually, each has significant shortcomings. Existing implementations of reflective display technology, such as E-INK or MARISOL display technologies, have not been utilized in combination with touch-based input devices, such as used in a touchscreen display device using capacitive touch-based input sensing, or using resistive, inductive, or other forms of touch-based input sensing. Existing reflective displays also do not provide haptic feedback. Moreover, existing implementations of reflective display technology have not been adapted to dynamically adjust to running applications, power state conditions, use-case conditions, manual configuration by users, et cetera. Additionally, as opposed to dot matrix E-INK, segmented E-INK, as used atop mechanical keys in a mobile phone, affords only a limited variation of rendered content. Accordingly, the existing uses of reflective display technology with information handling devices are quite limited.

Embodiments provide a display incorporating reflective display technology, for example E-INK or MIRASOL, within a touchable control area of an information handling device. The touchable control area may include a touch-based sensing layer, a haptic feedback layer, and an audible feedback means, or some suitable combination of the foregoing.

A touchable control area may be implemented as a module and occupy different portions of an information handling device. For example, the touchable control area may be implemented in a separate area, such as a discrete module located within an integrated keyboard of a laptop computer, a discrete module located within a stand alone keyboard, a discrete module located in place of a touchpad, or the control area may be implemented within an existing display component, such as occupying a portion of a touchscreen display, a portion of an e-reader reflective display, et cetera. The touchable control area may further occupy all or substantially all of an area, such as replacing all or substantially all of the area occupied by a conventional touchscreen display, replacing all or substantially all of an integrated laptop keyboard, or replacing all or substantially all of an e-reader reflective display.

An embodiment provides touch-based control. For example, an embodiment may utilize a capacitive layer and a capacitive touch controller. For example, the capacitive layer may include indium tin oxide (ITO) traces in combination with a rigid reflective display layer. Capacitive layer(s) will be used as non-limiting examples throughout; however, other means such as inductive and resistive sensing means are acceptable.

Embodiments may create touchable function "tiles" or areas (sub-areas of a touchable control). Any or all of these areas may be used alone or in combination with one another, and may be dynamically updated or configured. Embodiments may update the content rendered, using reflective display technology, on one or more of the tiles for example via use of a micro-controller. The number, size, reflective display and associated function(s) of the rendered tiles, and associated touch zones, may vary based on the number of controls desired at a given time, the emphasis given to each control in a particular use case, and the like. For example, more commonly used controls for a given running application may be displayed, as ascertained by consulting a user history, with most commonly used controls being displayed as larger or more prominent tiles. Because the touchable control area incorporates reflective display technology, the power draw is very low, for example essentially only drawing power when the display contents are changed (updated, configured, reconfigured).

Additionally, as capacitive sense based touch controls may operate in low power states, the touchable control area is suitable for replacing a dedicated power button (and thus may provide power-on/resume control). The z-direction sensitivity of the capacitive sense may be adjusted dynamically, for example based on system state to enable/disable "hover", such that a user's hands or another feature, such as a display lid, may enter the sensing zone to trigger different actions without actually touching the tiles. For example, sequential movement across adjacent touch zones may trigger unique gesture events. In the case of hover, actually touching the tiles is not required. Additionally, haptic (force or vibration) response may optionally be added to the touchable control area to provide haptic feedback, such as used to emulate the tactile feedback of a mechanical control. Additionally, audible feedback may be provided, similarly to haptic feedback.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/

DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
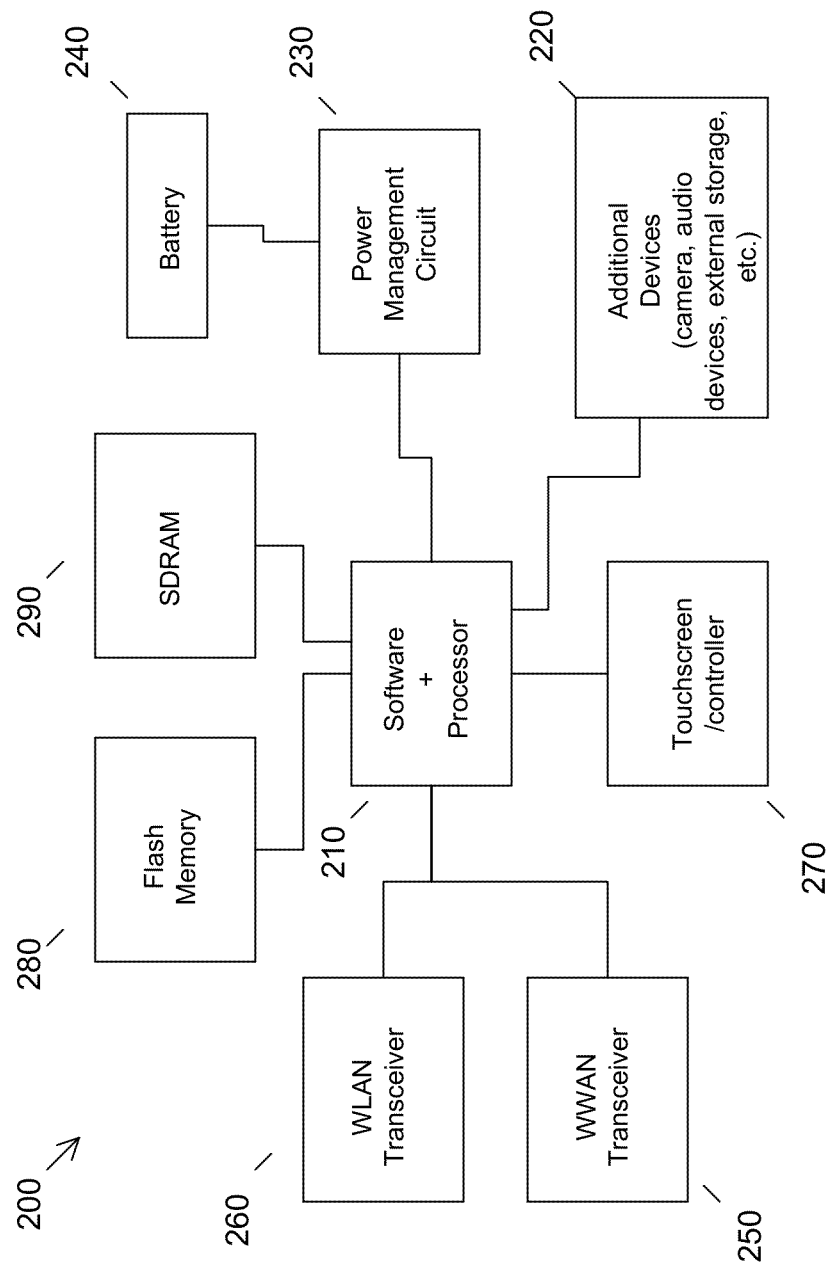
FIG. 2 illustrates another example circuitry of an information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

Figure 3:
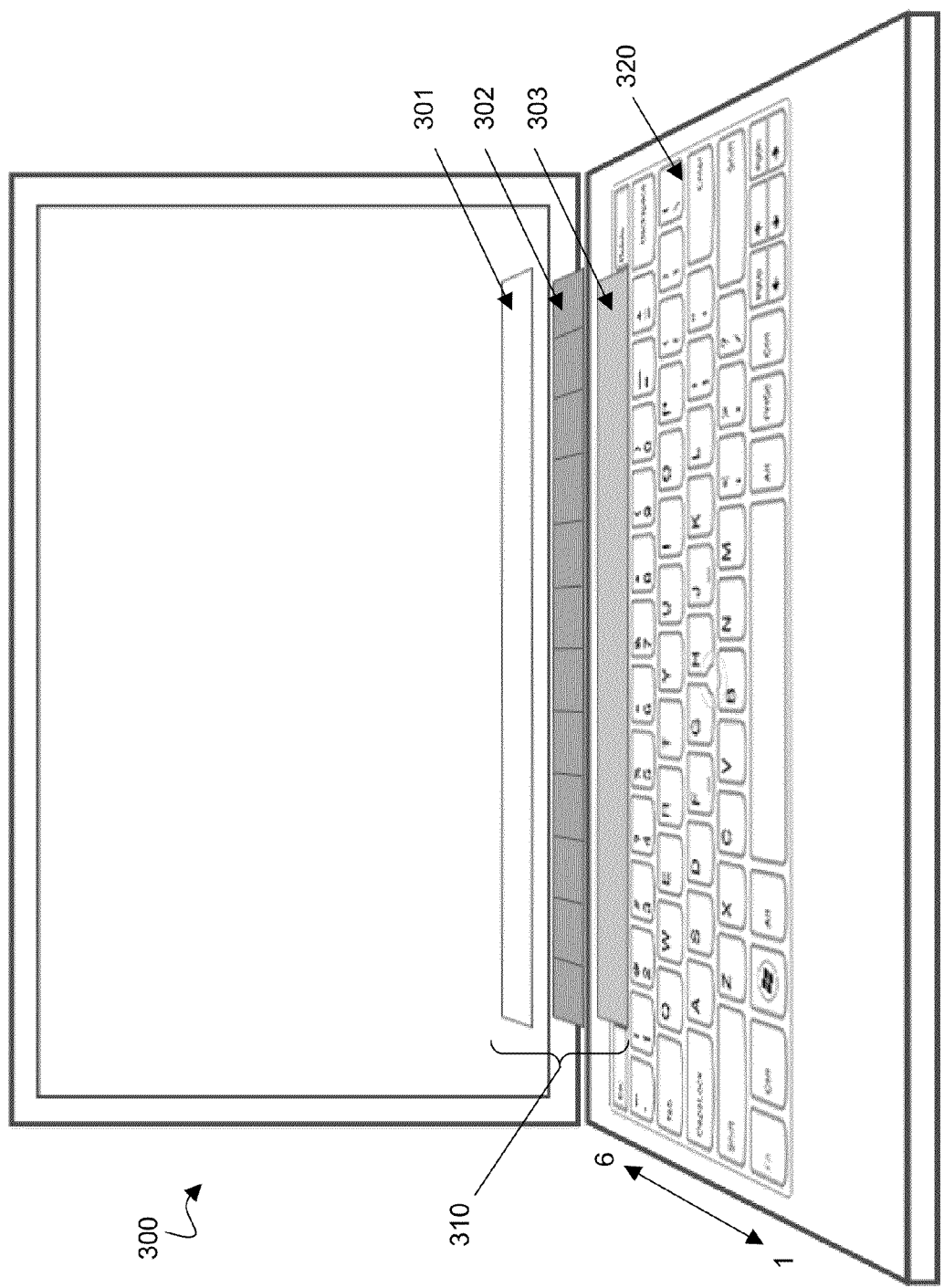
FIG. 3 illustrates an example touchable control area and example layers thereof.

Referring to FIG. 3, an embodiment provides an information handling device 300 with a touchable control area 310. The touchable control area includes a reflective display technology layer 301. The reflective display technology layer provides for low power visual display, and may be selected for example from EINK or MARISOL display technologies, as non-limiting examples. The reflective display layer may provide color display as well. The touchable control area 310 also includes a touch-based sensing layer 302, which may be a capacitive touch based layer as, by way of example, inclusion of ITO capacitive traces. The touchable control area 310 may also include a haptic layer 303, available from vendors such as Immersion Corp., which provides touch-based feedback. Similarly, audible feedback may be provided in combination with other layers.

In the example illustrated in FIG. 3, the touchable control area 310 is located in the upper portion of a standard QWERTY keyboard layout 320 of an information handling device 300, specifically in the sixth (6) row of keys. Thus, touchable control area 310 may replace some or all of the conventional sixth row (6) keys (commonly including at least "Esc"-"F12"); or, touchable control area 310 may be located elsewhere, as further described herein.

Figure 4:
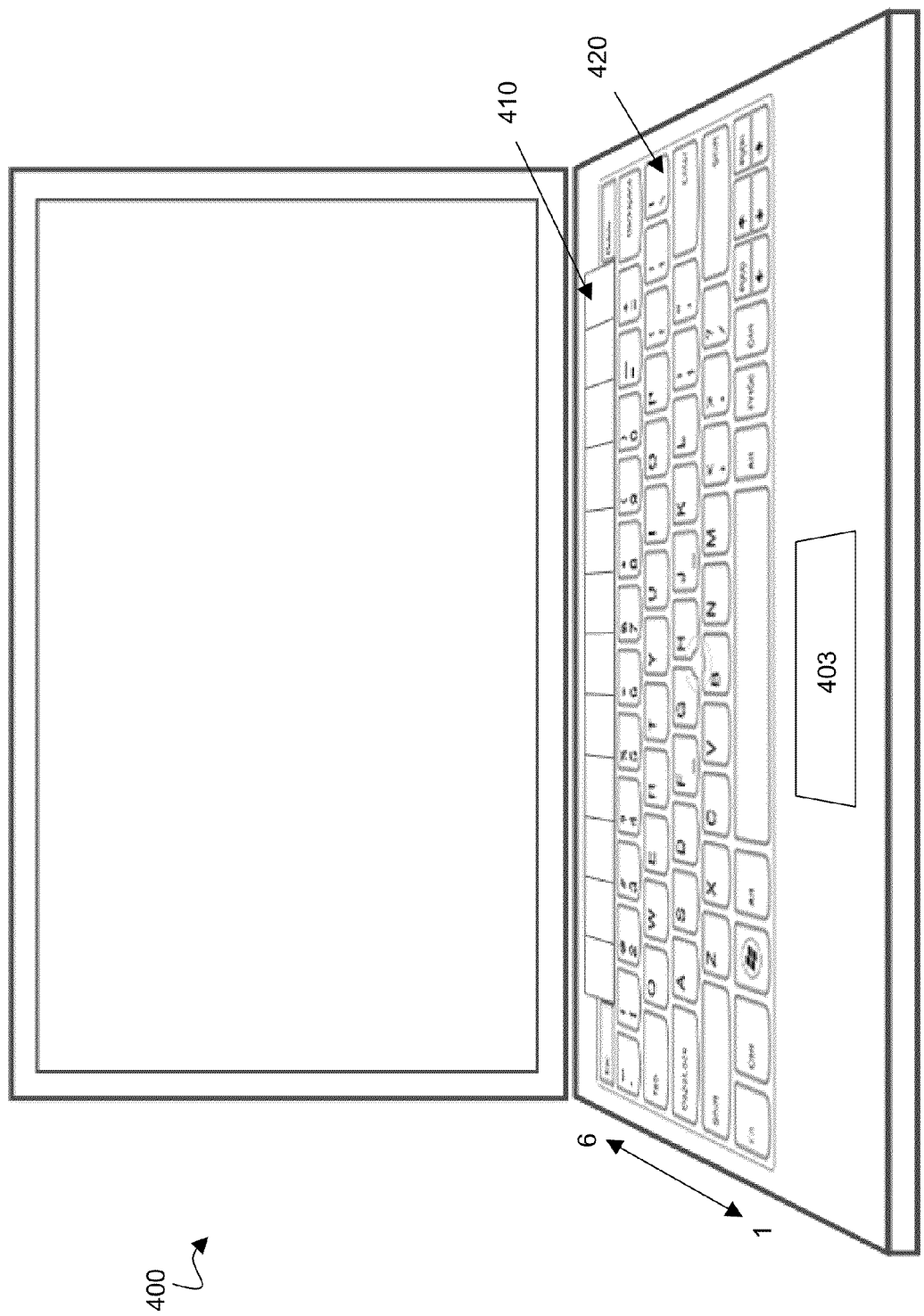
FIG. 4 illustrates example touchable control areas.

Illustrated in FIG. 4 is an example of a touchable control area 410 implemented on an information handling device 400 with layers (301, 302, 303 of FIG. 3) integrated in to a flat module. The example illustrated in FIG. 4 has a control area 410 sized to occupy less than the complete sixth row (6) in the keyboard 420. Here, touchable control area 410 is flanked on either side by standard keyboard keys. Note that though the touchable control sub-areas are described at times herein as replacing "key(s)", they may not take the shape of standard mechanical keys, but may rather be flat, logically defined areas of a touchable control area that mimic conventional reflective displays, with added functionality (for example, for touch input and/or haptic feedback). Also illustrated in FIG. 4 is another touchable control area 403 implemented in place of a touchpad and offering functionality equivalent thereto. That is, touchable control area 403 may accept touch-based input, and additionally provide reflective display, haptic feedback, audible feedback, or some suitable combination of the foregoing.

Referring to FIG. 5(A-B), an information handling device 500A, 500B may have a touchable control area 510A, 510B implemented as either part of a keyboard row, 510A, or occupying an entire keyboard row, 510B. Thus, touchable control area 510A replaces some of the standard sixth row standard keys, whereas touchable control area 510B replaces all the sixth row standard keys. Some non-limiting example measurements are illustrated for these two example implementations. In FIG. 5A, the touchable control area 510A is about 237 mm by 16 mm, whereas in FIG. 5B, the touchable control area 510B is about 282 mm by 16 mm.

Integral to touchable control area 410 is a touch-based sensing means, for example capacitive ITO traces illustrated in FIG. 6(A-B). FIG. 6A illustrates example ITO traces 602A (only some of which are specifically pointed to) that may be utilized in a touchable control area 610A of smaller proportions, for example touchable control area 510A. FIG. 6B illustrates example ITO traces 602B (only some of which are specifically pointed to) that may be utilized in a touchable control area 610B of larger proportions, for example touchable control area 510B. The capacitive traces may be dynamically configured, as further described herein.

Referring to FIG. 7 (A-C), some example configurations of "tiles" for use in a touchable control areas are illustrated. The "tiles" are logical areas (sub-areas) of a touchable control that define zones for user input (using for example capacitive ITO traces) and/or display (using a reflective display technology layer) and/or haptic feedback. Audible feedback may be provided in connection with the tiles, as described herein. Here, the tiles are illustrated as squares or rectangles, but this is merely for illustration and they may take other shapes depending upon the desired implementation. Importantly, the tiles may be programmed such that they may take on one configuration, then take on other configurations. That is, the tiles may be dynamically changed to accommodate different touch zones, different display zones, different haptic feedback zones, and/or different audible feedback zones, as further described herein.

Figure 7A:
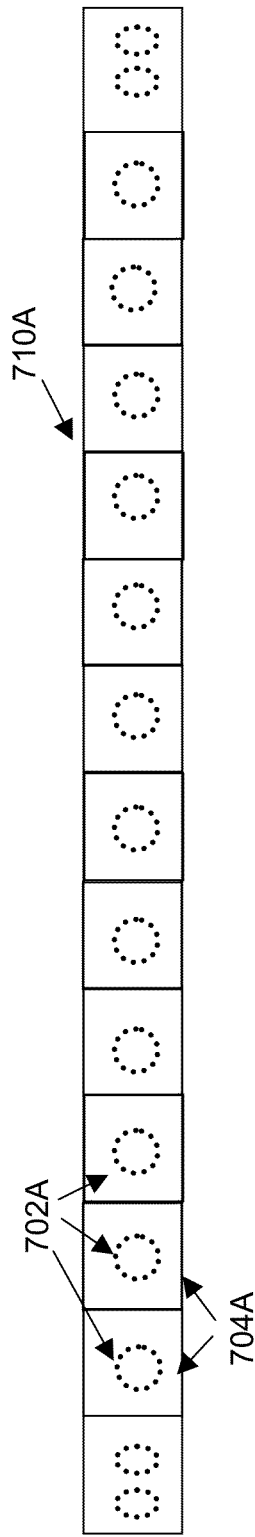
FIG. 7(A-C) illustrates example configurable tiles/areas of touchable control areas having capacitive traces therein.
Figure 7B:
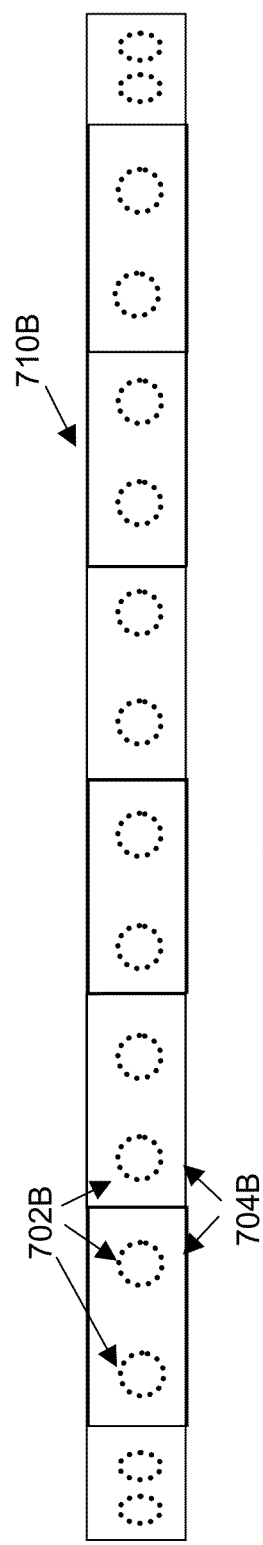
Figure 7C:
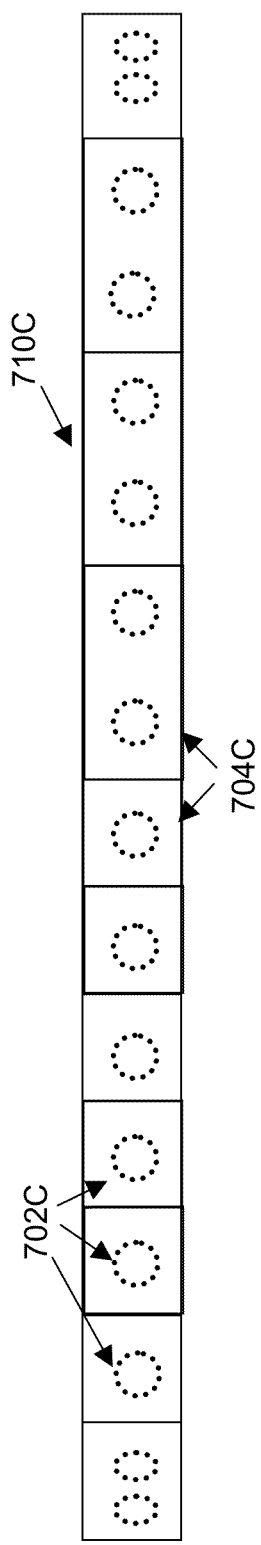

In the example of FIG. 7A, individual ITO traces 702A (only some of which are specifically pointed to) occupy a single tile area, delineated by boxes 704A, except for end areas, which have two smaller ITO traces. In the example of FIG. 7B, multiple ITO traces 702B (only some of which are specifically pointed to) occupy larger tile areas, indicated by rectangular shapes 704B (only some of which are specifically pointed to). In the example of FIG. 7C, a mixture of the foregoing is illustrated. Thus, some ITO traces occupy individual tiles, whereas in other, larger tiles, multiple ITO traces are located. The ITO traces may be logically grouped or separated to impart different sized and shaped touch zones. The reflective displays of these areas may be similarly configured. Thus, embodiments may provide tiles of FIG. 7A in one case, and be updated to contain tiles of FIG. 7B or FIG. 7C in another.

Figure 8:
FIG. 8 illustrates an example default power-on touchable control area.

Referring to FIG. 8, an example of a touchable control area 810 implemented on an information handling device 800 is illustrated. Here, the example touchable control area 810 is implemented as occupying part of the sixth row (6) of a standard keyboard 820, replacing the standard keyboard keys and offering dynamically configurable functionality and/or display, as further described herein. Using the reflective display technology layer, different reflective displays may be displayed on each tile, which in their current configuration are indicated by the fifteen (15) boxes outlined in the touchable control area 810. Any individual tile may contain a unique display using the reflective display technology, or, a combination of some or all of the tiles may be utilized to provide a display.

In the example illustrated in FIG. 8, tile 804 is displayed as a home tile, with an appropriate display of a home icon contained therein. The home tile display may be part of a default display for the control area 810. For example, the display of the tiles in touchable control area 810 may be those utilized during a power-on system state, prior to the user opening any applications on the information handling device 800.

Thus, home tile 804 may be configured to sense touch input, such as a single tap, that when sensed executes an application function, similar to a conventional touchscreen display. For example, touching the home tile 804 in a power-on state may return a user to a "home view", such as on a tablet computing device, or may return the touchable control area 810 to the power-on default configuration if pressed in an updated configuration.

The other tiles in the touchable control area 810 may have other reflective displays, such as an icon on each of the remaining tiles indicating the function associated with touching the tiles, for example the functions associated with the standard keyboard keys that the tiles replace. Additional or other display/functionality may be associated with the tiles as well. For example, tile 805 may be a menu tile, with an appropriate visual icon displayed using reflective display technology of the tile 805 area. Responsive to touching the menu tile 805, a menu may be launched, allowing the user to view a menu (not shown) on a display device 806 of the information handling device. For example, the menu may include selectable user options for editing tile configurations of the touchable control area 810.

The tiles of the touchable control area 810 are configurable. This may be a user or manual configuration, for example via a menu interface as described above, or an automatic configuration, such as for example responsive to power state, device orientation, open application(s) detected or functions executed therein, time of day, lighting conditions, connected devices, user history, or the like. The tiles are configurable in that the actual area occupied by the tile may be changed, such as changing the tile shapes to create different reflective displays/touch zones/haptic feedback/audible feedback areas. For example, if a user opens or brings to the foreground a particular (active) application or enters a particular power state, the touchable control area may update the reflective display (of one or more of the tiles) and/or the touch zones to appropriately match the use condition.

Figure 9:
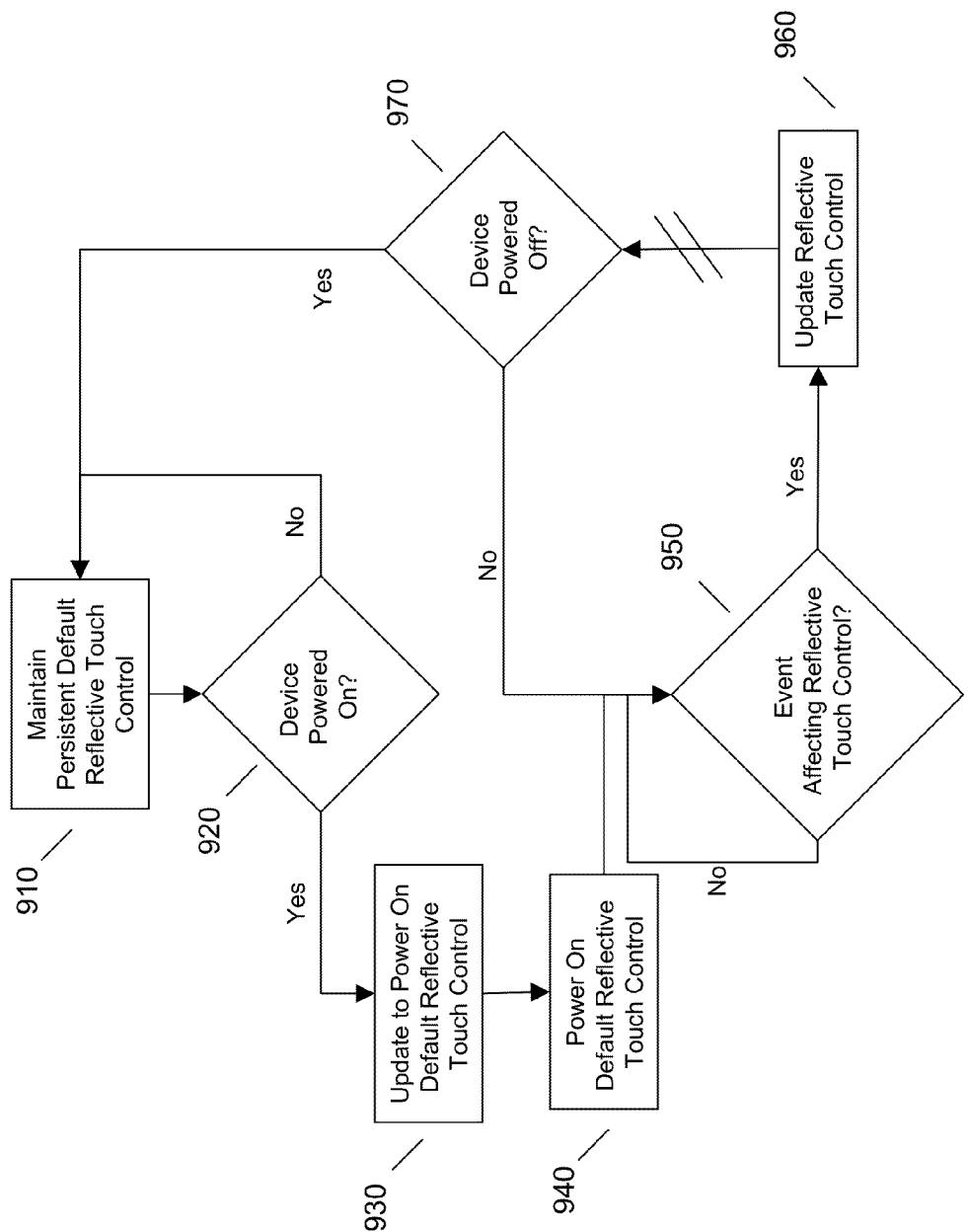
FIG. 9 illustrates an example method for updating a touchable control area.

Referring to FIG. 9, an example of changing (updating, configuring, reconfiguring) a touchable control area included in an information handling device is illustrated. At the outset 910, the touchable control area may be configured to maintain a persistent reflective display in the power-off state. This is possible due to the fact that the touchable control area does not draw much power, as reflective display layer and capacitive touch layer (and optionally, haptic/audible layers) do not require much power to maintain a persistent display, et cetera. Thus, the user may configure or maintain a default power-off reflective display, such as piece of artwork, a standard set of keyboard key icons, a standard set of keyboard icons with a power-on tile, or the like, in the power-off system state.

Responsive to the information handling device being powered on 920, which may be accomplished via touching a power-on tile of the touchable control area, the touchable control area may update 930 the reflective display to include a default power-on reflective display, with associated functionality of the tiles appropriately modified. A specific, non-limiting example of a power-on default configuration for a touchable control area is illustrated in FIG. 8. For example, a power-on default reflective display may be that of touchable control area 810 of FIG. 8.

From the power-on default reflective display 940, an input to a control module for the touchable control area may be detected 950 that indicates tile configuration(s) (in terms of reflective display of tile(s) and/or size/shape of the tiles and/or their associated touch sense and/or haptic/audible feedback areas, et cetera) are to be updated. For example, the user may open a menu for manually configuring the tiles, as described herein. Other examples include the user opening an application, making an application an active application, connecting another device to the information handling device, transitioning the power state, pressing a mechanical button, pressing within/interfacing with the touchable control area, or the like. Each of these actions may update the tile configuration(s) used in the touchable control area.

For example, if an Internet browser application is opened, the touchable control area tile configurations may be updated 950 from their default configuration (for example, having function key icons reflectively displayed on some tiles) to an Internet browser configuration (for example, having a home tile, a forward tile, a back tile, et cetera). Each of the updated tiles may then be associated with an updated functionality. For example, a "function" tile may be updated to a "back" tile, and thus be utilized by a user to go back one page (load previous page) in an Internet browser using the updated tile.

At some point the information handling device may be powered off 970 (or otherwise undergo a power state transition, such as to hibernate or suspend). Responsive to the information handling device being powered off 970, the touchable control area again may be updated to the persistent default reflective display (system power-off default). Accordingly, even when the device is "powered off", the touchable control area may maintain a reflective display, which again is configurable such that the tiles, however configured, display an appropriate reflective display in the power-off state. An example of the power-off default display may be a reflective display of standard keys that would normally appear in the sixth row of the user's keyboard, another example may be reflective display of customized artwork, such as customized text and/or graphics, et cetera.

Embodiments thus provide a touchable control area for use in connection with an information handling device. The touchable control area may be integrated within the information handling device or may be included in a component used with an information handling device. Thus, for example, the touchable control area may be integrated within an information handling device such as a stand alone keyboard to used with another information handling device, such as a desktop computer or the like.

Figure 10:
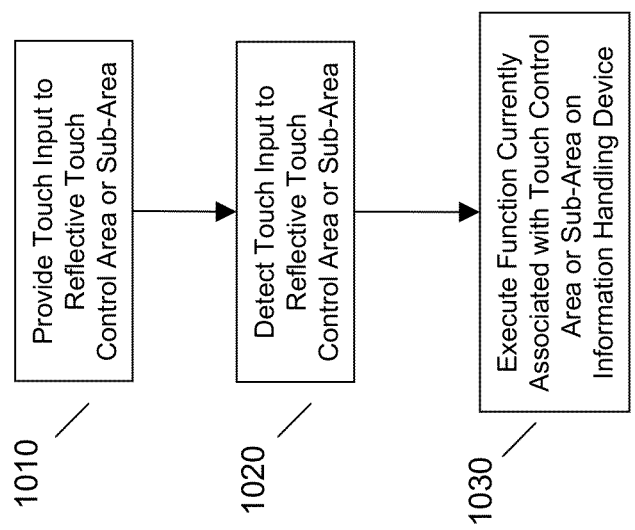
FIG. 10 illustrates an example method for executing function(s) using a touchable control area.

Referring to FIG. 10, an example method for using a touchable control area is illustrated. A user may provide touch-based input, such as a finger tap to an individual area or tile of the touchable control area, a finger swipe crossing multiple areas (sub-areas) of the touchable control area, or multiple inputs (touch an hold, multi-finger input, gesture input, and the like) 1010. The touch-based input may also include input using an inanimate component, such as a stylus. Moreover, the sensitivity (noise) of the capacitive sensing layer may be adjusted such that actually touching the touchable control area (either by way of direct user/finger input and/or inanimate component input) is not necessary. Thus, "hovering" input, such as a user gesturing over the touchable control area, or an inanimate component, such as a laptop lid, coming into proximity of the capacitive sensing layer, is ascertained as touch-based input.

Responsive to the touch-based input, the touchable control area detects the touch-based input 1020 and provides an appropriate signal based on the current configuration of the tile or tiles (area or areas) that have sensed the touch-based input. Responsive to detecting the touch-based input, an appropriate function may be executed on the information handling device 1030. For example, a user may provide touch input to a power on tile within the touchable control area, which executes a power-on function for the information handling device. Likewise, a user may provide input to a tile having a function key icon, whereby the associated function (for example, "F4") is executed, et cetera.

Embodiments may be implemented in one or more information handling devices configured appropriately to execute program instructions consistent with the functionality of the embodiments as described herein. In this regard, FIGS. 1-2 illustrate non-limiting examples of such devices and components thereof. While mobile computing systems such as tablet computers, laptop computers, and smart phones have been specifically mentioned as examples herein, embodiments may be implemented using other systems or devices, such as desktops, workstations, servers, stand alone keyboards and key pads (numeric, CAD, et cetera), stylus/finger touchpads with control button functions, remote controls and the like.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied therewith.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
providing reflective display in reflective display layer of a touchable control having one or more areas, wherein said reflective display substantially only draws power when the display contents are changed;
said touchable control area being disposed in a keyboard area among a plurality of mechanical keys of an information handling device;
displaying data on a display device of the information handling device which does not overlap the reflective display of said one or more areas;
ascertaining, using a non-display touch sensitive layer located with the reflective display layer of the touchable control, touch-based input to said one or more areas of said touchable control area; and
executing one or more functions responsive to said touch-based input.

2. The method of claim 1, wherein said one or more areas of said touchable control area comprise a plurality of logically defined areas.

3. The method of claim 1, wherein said touchable control area comprises a haptic feedback layer.

4. The method of claim 3, wherein said non-display touch sensitive layer comprises one of a capacitive touch-based input sensing layer, a resistive touch-based input sensing layer, and an inductive touch-based input sensing layer.

5. The method of claim 1, wherein said executing one or more functions comprises one or more of:
providing haptic feedback responsive to said touch-based input; and
providing audible feedback responsive to said touch-based input.

6. The method of claim 1, further comprising:
providing a default configuration for one or more areas on the touchable control area;
ascertaining an event for updating said default configuration; and
updating said default configuration to an updated configuration responsive to said event.

7. The method of claim 6, wherein said updated configuration comprises a different reflective display on one or more areas of said touchable control area.

8. The method of claim 6, wherein said updated configuration comprises a different touch zone configuration for said one or more areas of said touchable control area.

9. The method of claim 6, wherein said event comprises one or more of an application related event, a power state change event; a connected device related event, and a user input event.

10. An information handling device comprising:
a touchable control area having one or more areas, said one or more areas comprising a reflective display layer that provides reflective display and a non-display touch sensitive layer located with the reflective display layer that ascertains touch-based input, wherein said reflective display substantially only draws power when the display contents are changed;
said touchable control area being disposed in a keyboard area among a plurality of mechanical keys;
a display device which does not overlap the reflective display of said one or more areas; and
one or more processors;
wherein, responsive to execution of computer program instructions accessible to one or more processors, the information handling device:
displays data on the display device;
ascertains touch-based input to said one or more areas of said touchable control area; and
executes one or more functions responsive to said touch-based input.

11. The information handling device of claim 10, wherein said one or more areas of said touchable control area comprise a plurality of logically defined areas.

12. The information handling device of claim 10, wherein said touchable control area comprises a haptic feedback layer.

13. The information handling device of claim 12, wherein said non-display touch sensitive layer comprises one of a capacitive touch-based input sensing layer, a resistive touch-based input sensing layer, and an inductive touch-based input sensing layer.

14. The information handling device of claim 10, wherein to execute one or more functions comprises one or more of:
providing haptic feedback responsive to said touch-based input; and
providing audible feedback responsive to said touch-based input.

15. The information handling device of claim 10, wherein said information handling device is further configured to:
provide a default configuration for one or more areas on the touchable control area;
ascertain an event for updating said default configuration; and
update said default configuration to an updated configuration responsive to said event.

16. The information handling device of claim 15, wherein said updated configuration comprises one or more of:
a different reflective display on one or more areas of said touchable control area; and
a different touch zone configuration for said one or more areas of said touchable control area.

17. The information handling device of claim 10, wherein said event comprises one or more of an application related event, a power state change event; a connected device related event, and a user input event.

18. The information handling device of claim 10, wherein said touchable control area comprises a non-back lit reflective display layer;
wherein said non-back lit reflective display layer overlays a touch sensitive display layer.

19. The information handling device of claim 10, wherein the touchable control area is disposed in a keyboard area in place of mechanical function keys.

20. A program product comprising:
a storage device having program code embodied therewith, the program code comprising:
computer readable program code that provides reflective display in reflective display layer of a touchable control having one or more areas, wherein said reflective display substantially only draws power when the display contents are changed;
said touchable control area being disposed in a keyboard area among a plurality of mechanical keys of an information handling device;
computer readable program code that displays data on a display device of the information handling device which does not overlap the reflective display of said one or more areas;
computer readable program code that ascertains touch-based input provided to a non-display touch sensitive layer located with the reflective display layer of said one or more areas of said touchable control area; and
computer readable program code that executes one or more functions responsive to said touch-based input.

21. An information handling device comprising:
a display device;
a touchable control area having a reflective display layer, a touch-based input sensing layer disposed underneath the reflective display layer, and a haptic feedback layer disposed underneath the touch-based input sensing layer, wherein said reflective display substantially only draws power when the display contents are changed;
said touchable control area being disposed in a keyboard area among a plurality of mechanical keys; and
one or more processors;
wherein, responsive to execution of computer program instructions accessible to one or more processors, the information handling device is configured to:
display data on the display device;
ascertain touch-based input to one or more areas of said touchable control area; and
execute one or more functions responsive to said touch-based input.

* * * * *